United States Patent
Nakamoto et al.

(10) Patent No.: US 11,489,200 B2
(45) Date of Patent: Nov. 1, 2022

(54) LIQUID ELECTROLYTE AND FLUORIDE ION BATTERY

(71) Applicants: Hirofumi Nakamoto, Susono (JP); Reiji Takekawa, Sendai (JP); Junichi Kawamura, Sendai (JP)

(72) Inventors: Hirofumi Nakamoto, Susono (JP); Reiji Takekawa, Sendai (JP); Junichi Kawamura, Sendai (JP)

(73) Assignees: TOYOTA JIDOSHA KABUSHIKI KAISHA, Toyota (JP); TOHOKU UNIVERSITY, Sendai (JP)

( * ) Notice: Subject to any disclaimer, the term of this patent is extended or adjusted under 35 U.S.C. 154(b) by 299 days.

(21) Appl. No.: 16/824,272

(22) Filed: Mar. 19, 2020

(65) Prior Publication Data

US 2020/0321654 A1    Oct. 8, 2020

(30) Foreign Application Priority Data

Apr. 4, 2019   (JP) ............... JP2019-072061

(51) Int. Cl.
| H01M 10/0568 | (2010.01) |
| H01M 10/0569 | (2010.01) |
| H01M 10/0567 | (2010.01) |
| H01M 10/05 | (2010.01) |

(52) U.S. Cl.
CPC ....... *H01M 10/0567* (2013.01); *H01M 10/05* (2013.01); *H01M 10/0568* (2013.01); *H01M 10/0569* (2013.01); *H01M 2300/0028* (2013.01)

(58) Field of Classification Search
CPC ............. H01M 10/0567; H01M 10/05; H01M 10/0568; H01M 10/0569; H01M 10/054; H01M 2300/0028

See application file for complete search history.

(56) References Cited

U.S. PATENT DOCUMENTS

2016/0087308 A1 *   3/2016   Nakamoto ........ H01M 10/0569
429/341

FOREIGN PATENT DOCUMENTS

| EP | 2999044 A1 | 3/2016 |
| EP | 3043410 A1 | 7/2016 |
| JP | 2009-529222 A | 8/2009 |
| JP | 2011-251927 A | 12/2011 |
| JP | 2016-062821 A | 4/2016 |
| WO | 2007/146453 A2 | 12/2007 |

OTHER PUBLICATIONS

U.S. Appl. No. 16/597,946, filed Oct. 10, 2019 in the name of Hirofumi Nakamoto et al.

* cited by examiner

*Primary Examiner* — Eugenia Wang
(74) *Attorney, Agent, or Firm* — Oliff PLC

(57) ABSTRACT

A main object of the present disclosure is to provide a liquid electrolyte in which concentration of active fluoride ion is high. The present disclosure achieves the object by providing a liquid electrolyte to be used in a fluoride ion battery, the liquid electrolyte comprising: a potassium fluoride; an alkali metal amide salt including a cation of an alkali metal and an amide anion; and a glyme represented by a general formula $R^1$—$O(CH_2CH_2O)_n$—$R^2$, in which $R^1$ and $R^2$ is each independently an alkyl group including 4 or less carbon atoms or a fluoroalkyl group including 4 or less carbon atoms, and n is within a range of 2 to 10.

2 Claims, 3 Drawing Sheets

LIQUID ELECTROLYTE AND FLUORIDE ION BATTERY

TECHNICAL FIELD

The present disclosure relates to a liquid electrolyte in which concentration of active fluoride ion is high.

BACKGROUND ART

As high-voltage and high-energy density batteries, for example, Li ion batteries are known. The Li ion battery is a cation-based battery utilizing the reaction of Li ions with cathode active materials, and the reaction of Li ions with anode active materials. Meanwhile, as anion-based batteries, fluoride ion batteries utilizing the reaction of fluoride ions are known.

For example, Patent Literature 1 discloses a cathode, an anode, and an electrochemical cell (fluoride ion battery) capable of conducting anion charge carrier ($F^-$). Also, in Example of Patent Literature 1, a liquid electrolyte in which $LiBF_4$ is dissolved in an organic solvent that is the mixture of polypyrene carbonate (PC) and dimethyl carbonate (DMC), is used. Also, Patent Literature 2 discloses a fluoride ion battery using a liquid electrolyte that contains a cesium fluoride (CsF) as a fluoride salt.

CITATION LIST

Patent Literatures

Patent Literature 1: Japanese Unexamined Patent Application Laid-Open (JP-A) No. 2009-529222
Patent Literature 2: Japanese Patent Application Laid-Open (JP-A) No. 2016-062821

SUMMARY OF DISCLOSURE

Technical Problem

For example, in Patent Literature 2, improvement in the stability of fluoride ion is intended to be achieved by using the cesium fluoride as a fluoride salt, a metal amide and glyme; however, there is room for improving concentration of active fluoride ion.

The present disclosure has been made in view of the above circumstances and a main object thereof is to provide a liquid electrolyte in which concentration of active fluoride ion is high.

Solution to Problem

In order to achieve the object, the present disclosure provides a liquid electrolyte to be used in a fluoride ion battery, the liquid electrolyte comprising: a potassium fluoride; an alkali metal amide salt including a cation of an alkali metal and an amide anion; and a glyme represented by a general formula $R^1$—$O(CH_2CH_2O)_n$—$R^2$, in which $R^1$ and $R^2$ is each independently an alkyl group including 4 or less carbon atoms or a fluoroalkyl group including 4 or less carbon atoms, and n is within a range of 2 to 10.

According to the present disclosure, a potassium fluoride, an alkali metal amide salt, and a glyme are used in combination so as to allow the liquid electrolyte to have high concentration of active fluoride ion.

In the disclosure, it is preferable that the n in the general formula is 3 or 4.

In the disclosure, it is preferable that the glyme is a tetraglyme of which the $R^1$ and the $R^2$ are a methyl group and the n is 4.

In the disclosure, it is preferable that the amide anion is bis(fluorosulfonyl)amide (FSA) anion.

In the disclosure, it is preferable that the alkali metal is Li.

Also, the present disclosure provides a fluoride ion battery comprising a cathode active material layer, an anode active material layer, and an electrolyte layer formed between the cathode active material layer and the anode active material layer; wherein the electrolyte layer contains the above described liquid electrolyte.

According to the present disclosure, usage of the above described liquid electrolyte with high concentration of active fluoride ion allows a fluoride ion battery to have high electrode activity.

Advantageous Effects of Disclosure

The liquid electrolyte in the present disclosure exhibits an effect of high concentration of active fluoride ion.

DESCRIPTION OF EMBODIMENTS

Figure 1:
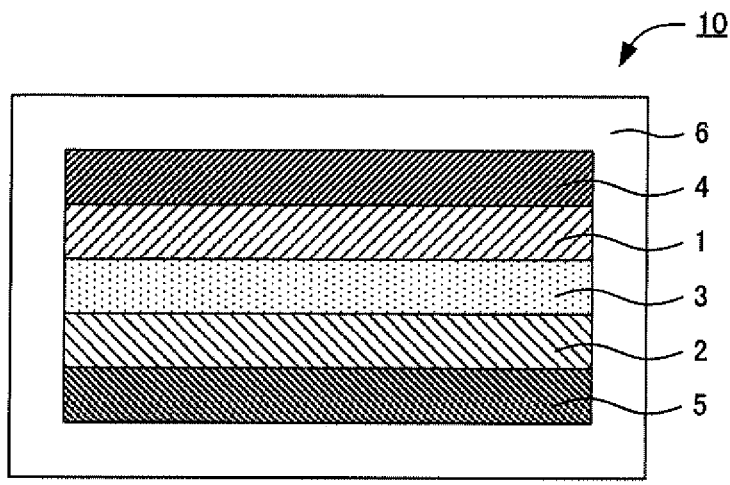
FIG. 1 is a schematic cross-sectional view illustrating an example of a fluoride ion battery in the present disclosure.

A liquid electrolyte and a fluoride ion battery in the present disclosure will be hereinafter described in details.

A. Liquid Electrolyte

The liquid electrolyte in the present disclosure is used in a fluoride ion battery, and comprises: a potassium fluoride; an alkali metal amide salt including a cation of an alkali metal and an amide anion; and a glyme represented by a general formula $R^1$—$O(CH_2CH_2O)_n$—$R^2$, in which $R^1$ and $R^2$ is each independently an alkyl group including 4 or less carbon atoms or a fluoroalkyl group including 4 or less carbon atoms, and n is within a range of 2 to 10.

According to the present disclosure, a potassium fluoride, an alkali metal amide salt, and a glyme are used in combination so as to allow the liquid electrolyte to have high concentration of active fluoride ion. Here, the glyme can be expected to have high chemical stability to fluoride ions. Meanwhile, the ion binding properties of fluoride salt such as the potassium fluoride are extremely strong. An ether group included in the glyme does not have enough electron donating properties to separate the ion bond of the potassium fluoride; thus, the potassium fluoride is insoluble to the glyme. To solve the problem, an alkali metal amide salt is used along with the potassium fluoride and the glyme, and thus the potassium fluoride can be dissolved in the glyme. This is presumably because the ion separation of the potassium fluoride may be promoted by the addition of the alkali metal amide salt. In more specific, the solvation of the alkali metal amide salt in the glyme allows the glyme to easily interact with the fluoride ions and thus the ion separation of the potassium fluoride is presumably promoted. Also, it is considered that in the fluoride salt, the larger the ion radius of cation is, the easier the separation becomes and the higher the fluoride ion concentration becomes; however, as shown in the later described Example, the concentration of active fluoride ion was surprisingly high in the potassium fluoride in specific. This is presumably because the separated potassium ion ($K^+$ having appropriate ion size is captured well by the glyme or an amide anion such as bis(fluorosulfonyl) amide (FSA) anion, which results in the improvement of stable fluoride ion concentration. Incidentally, in the liquid electrolyte in the present disclosure, the potassium fluoride is preferably completely dissolved, but the potassium fluoride may be dissolved at least partially.

As described above, the liquid electrolyte in the present disclosure has high active fluoride ion concentration. Thus, the activity of fluoride ions fluorinating active materials may be improved; as the result, improvement of the electrode activity in the fluoride ion battery may be achieved.

Each constitution of the liquid electrolyte in the present disclosure will be hereinafter explained in details.

1. Glyme

The glyme in the present disclosure is a compound represented by a general formula $R^1$—$O(CH_2CH_2O)_n$—$R^2$, in which $R^1$ and $R^2$ is each independently an alkyl group including 4 or less carbon atoms or a fluoroalkyl group including 4 or less carbon atoms, and n is within a range of 2 to 10.

In the general formula, $R^1$ and $R^2$ may be the same and may be different from each other. Also, the carbon number of $R^1$ or $R^2$ is usually 4 or less; it may be any of 4, 3, 2, and 1. If the carbon number of $R^1$ or $R^2$ is too large, there is a possibility that the interaction with fluoride ions may be sterically inhibited. Specific examples of the alkyl group that has 4 or less carbon atoms may include a methyl group, an ethyl group, a propyl group, an isopropyl group, a butyl group, a sec-butyl group, an isobutyl group, and a tert-butyl group. Also, the fluoroalkyl group is a group in which the whole or a part of hydrogen in the alkyl group is substituted with fluorine.

In the general formula, n is usually within the range of 2 to 10. The n may be 3 or more. If the n is too small, there is a possibility that the alkali metal ion under the presence of fluoride ions may become a fluoride salt. Meanwhile, the n may be 8 or less, and may be 5 or less. If the n is too large, the interaction of glymes would be strong, and there is a possibility that the solvation with the alkali metal ion may not easily occur. In the present disclosure, the glyme represented by the general formula may be used in just one kind, and two kinds or more thereof may be used in combination.

Also, examples of the glyme in the present disclosure may include diethylene glycol diethyl ether (G2), triethylene glycol dimethyl ether (G3), tetraethylene glycol dimethyl ether (G4), diethylene glycol dibutyl ether, diethylene glycol methyl ethyl ether, triethylene glycol methyl ethyl ether, and triethylene glycol butyl methyl ether. In particular, in the present disclosure, the tetraglyme in which the $R^1$ and $R^2$ is a methyl group and the n is 4, that is, tetraethylene glycol dimethyl ether (G4), is preferable. The reason therefor is to capture potassium ion ($K^+$) in the later described potassium fluoride well.

2. Potassium Fluoride

The liquid electrolyte in the present disclosure contains a potassium fluoride as a fluoride salt. The liquid electrolyte may contain, as the fluoride salt, just the potassium fluoride, and may contain an additional fluoride salt. In the latter case, the liquid electrolyte preferably contains the potassium fluoride mainly as the fluoride salt. The proportion of the potassium fluoride among all the fluoride salts is, for example, 70 weight % or more, may be 80 weight % or more, and may be 90 weight % or more. Incidentally, the fluoride salt refers to a compound of which anion is F.

There are no particular limitations on the concentration of the potassium fluoride in the liquid electrolyte. For example, it is 0.1 mol/L or more, preferably 0.3 mol/L or more, and more preferably 0.5 mol/L or more. Meanwhile, the concentration of the potassium fluoride is, for example, 6 mol/L or less, and preferably 3 mol/L or less.

3. Alkali Metal Amide Salt

The alkali metal amide salt in the present disclosure includes a cation of an alkali metal and an amide anion. The amide anion refers to the anion in which proton is taken out from secondary amine ($R^1R^2NH$).

Examples of the alkali metal may include Li, Na, K, Rb, and Cs. In the present disclosure, Li is particularly preferable. On the other hand, examples of the amide anion may include sulfonyl amide anion and silyl amide anion. The sulfonyl amide anion is an anion in which N (anion center) in the amide anion bonds with S in a sulfonyl group. The sulfonyl amide anion may include one of the sulfonyl group, and may include two thereof. It is preferable that the sulfonyl group bonds with an alkyl group (such as carbon number 4 or less), a fluoroalkyl group (such as carbon number 4 or less), or fluorine. Examples of the sulfonyl amide anion may include bis(fluorosulfonyl)amide (FSA) anion, and bis(trifluoromethanesulfonyl)amide (TFSA) anion. In the present disclosure, bis(fluorosulfonyl)amide (FSA) anion is particularly preferable.

The silyl amide anion is an anion in which N (anion center) in the amide anion bonds with Si in a silyl group. The silyl amide anion may include one of the silyl group, and may include two thereof. It is preferable that the silyl group bonds with an alkyl group (such as carbon number 4 or less), a fluoroalkyl group (such as carbon number 4 or less), or fluorine. Examples of the silyl amide anion may include bis(trimethylsilyl)amide (TMSA) anion, bis(trifluoromethylsilyl)amide anion, bis(trifluorosilyl)amide anion, bis(triethylsilyl)amide anion, bis(tertbutyldimethylsilyl)amide anion, and trimethylsilyl trifluoromethyl silyl amide anion. Also, the amide anion is preferably symmetry amide anion in which two functional groups bonds with N (anion center) are the same.

4. Liquid Electrolyte

The liquid electrolyte in the present disclosure usually contains the glyme as a solvent. The solvent of the liquid electrolyte may be just the glyme represented by the general formula, and may be a mixture of the glyme represented by the general formula and other solvent. The proportion of the glyme to all the solvent is, for example, 10 mol % or more, preferably 30 mol % or more, more preferably 50 mol % or more, further preferably 70 mol % or more, and particularly preferably 90 mol % or more.

Examples of the other solvent may include an ionic solution and a nonaqueous solvent. The ionic solution refers to a material of which melting point is 100° C. or less. Above all, the melting point of the ionic solution is preferably 50° C. or less, and more preferably 25° C. or less.

Examples of the cation of the ionic solution may include piperidinium skeleton cation, pyrrolidinium skeleton cation, imidazolium skeleton cation, ammonium cation, and phosphonium cation.

Examples of the anion of the ionic solution may include an amide anion typically represented by bis(fluorosulfonyl) amide (FSA) anion and bis(trifluoromethanesulfonyl)amide (TFSA) anion, a phosphate anion typically represented by hexafluoro phosphate anion and tris(pentafluoroethyl)trifluoro phosphate anion, a tetrafluoro borate (TFB) anion, and a trifreight anion.

There are no particular limitations on the kind of the nonaqueous solvent; examples thereof may include ethylene carbonate (EC), fluoro ethylene carbonate (FEC), difluoro ethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxy methane, 1,3-dimethoxy propane, diethyl ether, tetrahydrofuran, 2-methyl tetrahydrofuran, dimethyl sulfoxide (DMSO), and an arbitrary mixture of these.

There are no particular limitations on the concentration of the alkali metal amide salt in the liquid electrolyte; however, for example, it is 0.5 mol/L or more, preferably 2.5 mol/L or more, and more preferably 4 mol/L or more. Meanwhile, the concentration of the alkali metal amide salt is, for example, 8 mol/L or less, and preferably 6 mol/L or less.

The molar ratio B/A which is the ratio of the potassium fluoride (B) to the alkali amide salt (A) is, for example, within a range of 0.02 to 1.5, and preferably within a range of 0.05 to 1.

Incidentally, in the $F(HF)_x^-$ anion, F is not easily separated from HF. Accordingly, there may be some cases difficult to sufficiently fluorinate active materials. Incidentally, x is a real number larger than 0; for example, it satisfies $0<x\leq5$. Thus, it is preferable that the liquid electrolyte substantially does not contain the $F(HF)_x^-$ anion. "Substantially does not contain the $F(HF)_x^-$ anion" signifies that the proportion of the $F(HF)_x^-$ anion to all the anions present in the liquid electrolyte is 0.5 mol % or less. The proportion of the $F(HF)_x^-$ anion is preferably 0.3 mol % or less.

B. Fluoride Ion Battery

FIG. 1 is a schematic cross-sectional view illustrating an example of the fluoride ion battery in the present disclosure. Fluoride ion battery 10 illustrated in FIG. 1 comprises cathode active material layer 1, anode active material layer 2, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. Also, electrolyte layer 3 contains "A. Liquid electrolyte" above.

According to the present disclosure, usage of the above described liquid electrolyte having high concentration of active fluoride ion allows a fluoride ion battery to have high electrode activities.

The fluoride ion battery in the present disclosure will be hereinafter explained per each constitution.

1. Electrolyte Layer

The electrolyte layer in the present disclosure is a layer formed between the cathode active material layer and the anode active material layer. In the present disclosure, the electrolyte layer contains the above described liquid electrolyte. The thickness of the electrolyte layer varies greatly with the constitutions of the batteries, and thus there are no particular limitations thereon.

2. Cathode Active Material Layer

The cathode active material layer in the present disclosure is a layer containing at least a cathode active material. Also, the cathode active material layer may further contain at least one of a conductive material and a binder, other than the cathode active material.

The cathode active material in the present disclosure is usually an active material of which defluorination occurs during discharge. Examples of the cathode active material may include a simple substance of metal, an alloy, a metal oxide, and fluorides of these. Examples of the metal element included in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Above all, it is preferable that the cathode active material is Cu, $CuF_x$, Fe, $FeF_x$, Ag, and $AgF_x$. Incidentally, the x is a real number larger than 0. Also, additional examples of the cathode active material may include a carbon material and the fluoride thereof. Examples of the carbon material may include graphite, coke, and carbon nanotube. Also, further additional examples of the cathode active material may include a polymer material. Examples of the polymer material may include polyaniline, polypyrrole, polyacetylene, and polythiophene.

There are no particular limitations on the conductive material if it has desired electron conductivity, and examples of the conductive material may include a carbon material. Examples of the carbon material may include carbon black such as acetylene black, Ketjen black, furnace black and thermal black. Meanwhile, there are no particular limitations on the binder if it is chemically and electronically stable, and examples of the binder may include a fluorine-based binder such as polyvinylidene fluoride (PVDF) and polytetra fluoroethylene (PTFE). Also, the content of the cathode active material in the cathode active material layer is preferably larger from the viewpoint of capacity. Also, the thickness of the cathode active material layer varies greatly with the constitutions of batteries, and thus there are no particular limitations thereon.

3. Anode Active Material Layer

The anode active material layer in the present disclosure is a layer containing at least an anode active material. Also, the anode active material layer may further contain at least one of a conductive material and a binder, other than the anode active material.

The anode active material in the present disclosure is usually an active material of which fluorination occurs during discharge. Also, an arbitrary active material having lower potential than that of the cathode active material may be selected as the anode active material. Thus, the above described cathode active material may be used as the anode active material. Examples of the anode active material may include a simple substance of metal, an alloy, a metal oxide, and the fluoride of these. Examples of the metal element included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, Ba, and Pb. Above all, it is preferable that the anode active material is Mg, $MgF_x$, Al, $AlF_x$, Ce, $CeF_x$, La, $LaF_x$, Ca, $CaF_x$, Pb, and $PbF_x$. Incidentally, the x is a real number larger than 0. Also, the above described carbon material and polymer material may be used as the anode active material.

Regarding the conductive material and the binder, the same materials described for the above described cathode active material layer may be used. Also, the content of the anode active material in the anode active material layer is preferably larger from the viewpoint of capacity. Also, the thickness of the anode active material layer varies greatly with the constitutions of batteries, and thus there are no particular limitations thereon.

4. Other Constitutions

The fluoride ion battery in the present disclosure comprises at least the above described anode active material layer, cathode active material layer and electrolyte layer.

Further, the battery usually comprises a cathode current collector for collecting currents of the cathode active material layer and an anode current collector for collecting currents of the anode active material layer. Examples of the shape of the current collectors may include a foil shape, a mesh shape, and a porous shape. Also, the fluoride ion battery in the present disclosure may comprise a separator between the cathode active material layer and the anode active material layer. The reason therefor is to obtain a battery with higher safety.

5. Fluoride Ion Battery

There are no particular limitations on the fluoride ion battery in the present disclosure if it comprises the above described cathode active material layer, anode active material layer, and electrolyte layer. Also, the fluoride ion battery in the present disclosure may be a primary battery and may be a secondary battery, but preferably a secondary battery among them. The reason therefor is to be repeatedly charged and discharged and useful as a car-mounted battery for example. Also, examples of the shape of the fluoride ion battery in the present disclosure may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be hereinafter described in more details with reference to Examples. Incidentally, the fabrication of an evaluation liquid electrolyte was conducted in a glove box with the dew point of −95° C. or less, the $O_2$ concentration of 0.5 ppm or less, and under an Ar atmosphere.

Example 1

Lithium bis(fluorosulfonyl)amide (Li-FSA from Kishida Chemical Co., Ltd.) and potassium fluoride (KF from Alfa Aesar) were mixed with tetraglyme (G4, tetraethylene glycol dimethyl ether from Kishida Chemical Co., Ltd.), so as the molar concentration respectively became 4.5 mol/L and 0.45 mol/L. After that, the product was stirred in a sealed container made of a fluorine resin with the conditions of at 30° C. and for 70 hours or more, so as to obtain an evaluation liquid electrolyte.

Comparative Example 1

An evaluation liquid electrolyte was obtained in the same manner as in Example 1 except that lithium fluoride (LiF from Kojundo Chemical Laboratory Co., Ltd.) was used instead of KF.

Comparative Example 2

An evaluation liquid electrolyte was obtained in the same manner as in Example 1 except that sodium fluoride (NaF from Alfa Aesar) was used instead of KF.

Comparative Example 3

An evaluation liquid electrolyte was obtained in the same manner as in Example 1 except that cesium fluoride (CsF from KANTO CHEMICAL CO., INC.) was used instead of KF.

Comparative Example 4

An evaluation liquid electrolyte was obtained in the same manner as in Example 1 except that tetramethyl ammonium fluoride (TMAF from hansa fine chemical) was used instead of KF.

[Evaluation]

<NMR Measurement>

$^{19}$F-MNR measurement was conducted to the evaluation liquid electrolytes obtained in Example 1 and Comparative Examples 1 to 4. The measurement was conducted using a NMR device (AVANCE III 600, 5 mm TCI cryoprobe from Bruker) with the condition of 25° C. and the same sample amount.

Figure 2:
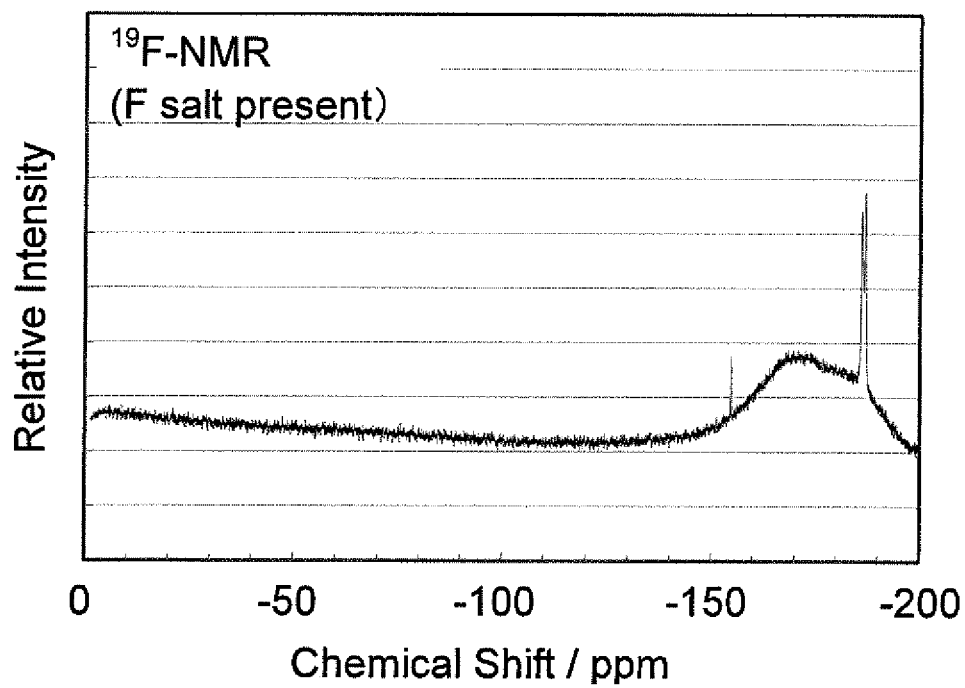
FIG. 2 is the result of $^{19}$F-MNR measurement for the liquid electrolyte in Example 1.
Figure 3:
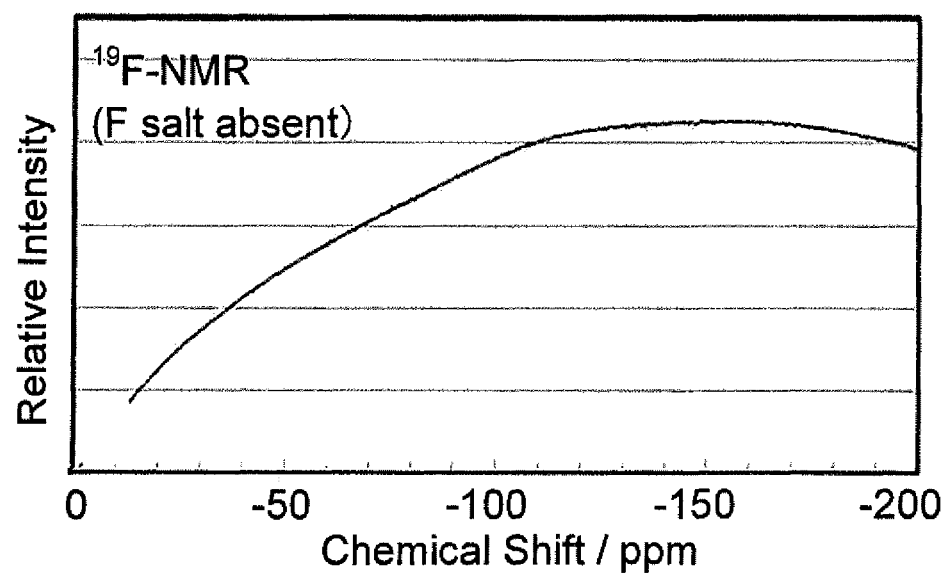
FIG. 3 is the result of $^{19}$F-MNR measurement for the liquid electrolyte not containing fluoride salt.
Figure 4:
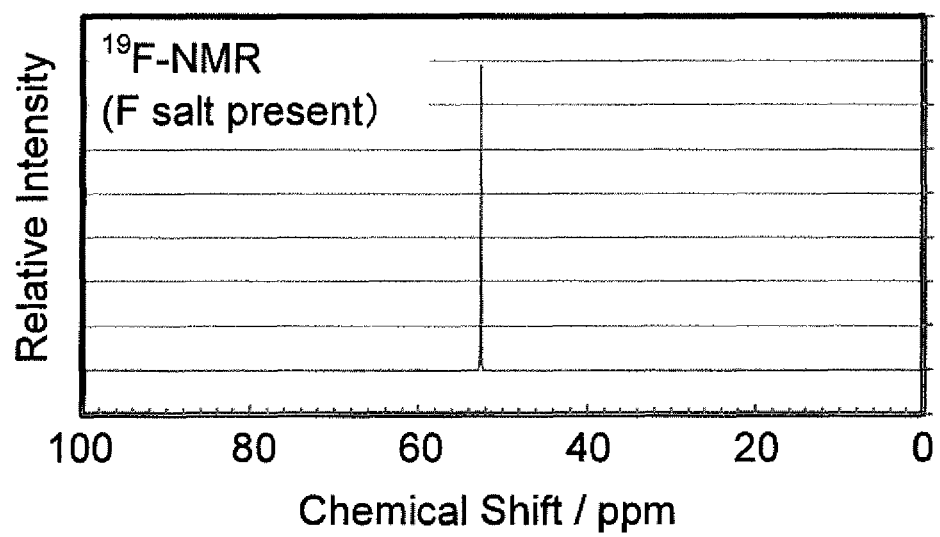
FIG. 4 is the result of $^{19}$F-MNR measurement for the liquid electrolyte in Example 1.

The result of Example 1 is shown in FIG. 2 as a representative result that shows the peak of $F^-$ (active $F^-$). Also, as data for reference, FIG. 3 shows the result of $^{19}$F-MNR measurement for a liquid electrolyte fabricated in the same manner as in Example 1 except that the fluoride salt was not used. In FIG. 2, a peak was confirmed in the vicinity of −185 ppm; however, this peak was not confirmed in FIG. 3. It was confirmed that this peak was the peak of $F^-$ (active $F^-$) derived from fluoride salt since the peak was confirmed when the fluoride salt was present. The result in high ppm side of $^{19}$F-MNR measurement to Example 1 is shown in FIG. 4. As shown in FIG. 4, a peak was confirmed in the vicinity of 55 ppm, which was the peak of F derived from FSA.

Also, the concentration of the active fluoride ion (active $F^-$) was obtained as follows. That is to say, an integral value (area) of FSA signal (signal having a peak in the vicinity of 55 ppm) and an integral value (area) of F (active $F^-$) signal (signal having a peak in the vicinity of −185 ppm) derived from fluoride salt were obtained; the integral ratio of these was obtained and the integral ratio was multiplied by FSA concentration (known concentration) to obtain the active $F^-$ concentration:

active $F^-$ concentration(mol/kg)=FSA concentration (mol/kg)*(integral value of active $F^-$)/{(integral value of FSA)/2}.

Figure 5:
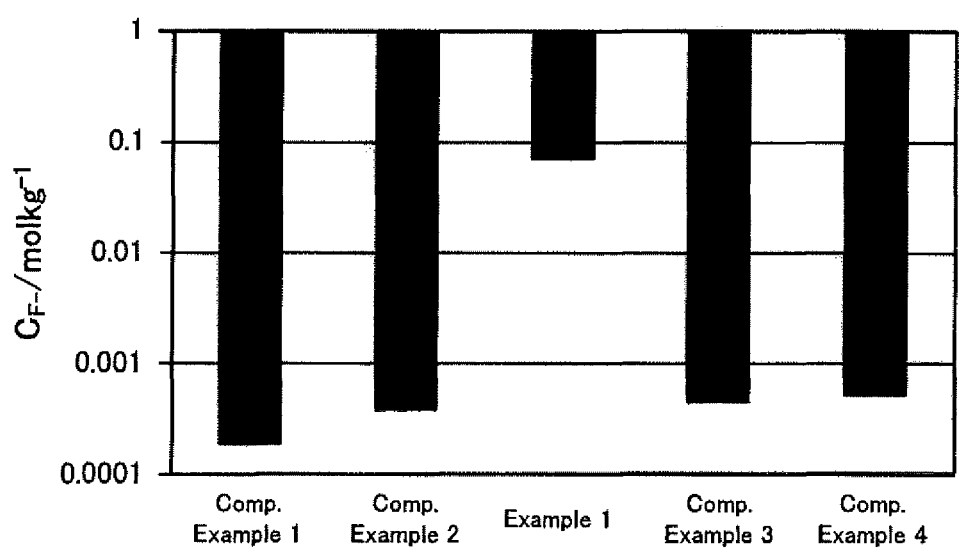
FIG. 5 is the result that shows the active F concentration of the liquid electrolytes in Example 1 and Comparative Examples 1 to 4.

The result is shown in FIG. 5.

As shown in FIG. 5, while the active F concentration of Comparative Examples 1 to 4 was less than 0.001 mol/kg, the active $F^-$ concentration of Example 1 was approximately 0.1 mol/kg, which was the improvement of active $F^-$ concentration moving a figure two places to the left. Thereby, it was confirmed that the concentration of active fluoride ion was remarkably increased when potassium fluoride was used as a fluoride salt. Also, it was suggested that the combination of potassium fluoride, G4, and FSA was preferable in a liquid electrolyte.

REFERENCE SIGNS LIST 1 cathode active material layer
2 anode active material layer
3 electrolyte layer
4 cathode current collector
5 anode current collector
6 battery case
10 fluoride ion battery

What is claimed is:

1. A liquid electrolyte to be used in a fluoride ion battery, the liquid electrolyte comprising:
    a potassium fluoride;
    an alkali metal amide salt including a cation of an alkali metal and an amide anion wherein the amide anion is bis(fluorosulfonyl)amide (FSA) anion, and the alkali metal is lithium; and
    a glyme represented by a general formula $R^1$—O$(CH_2CH_2O)_n$—$R^2$, wherein the glyme is a tetraglyme of which the $R^1$ and the $R^2$ are a methyl group and the n is 4.

2. A fluoride ion battery comprising a cathode active material layer, an anode active material layer, and an electrolyte layer formed between the cathode active material layer and the anode active material layer; wherein
    the electrolyte layer contains the liquid electrolyte according to claim 1.

* * * * *